United States Patent
Kang et al.

(10) Patent No.: US 8,938,790 B2
(45) Date of Patent: Jan. 20, 2015

(54) SYSTEM AND METHOD FOR PROVIDING SECURE ACCESS TO A REMOTE FILE

(71) Applicants: Seon Geun Kang, Seoul (KR); Jeong Hwan Park, Seoul (KR)

(72) Inventors: Seon Geun Kang, Seoul (KR); Jeong Hwan Park, Seoul (KR)

(73) Assignee: Brainzsquare Inc., San Jose ( * ) Notice: Subject to any disclaimer, the term of this patent is extended or adjusted under 35 U.S.C. 154(b) by 0 days.

(21) Appl. No.: 13/677,189

(22) Filed: Nov. 14, 2012

(65) Prior Publication Data

US 2014/0082717 A1  Mar. 20, 2014

(30) Foreign Application Priority Data

Sep. 19, 2012  (KR) .................. 10-2012-0103656

(51) Int. Cl.
  *G06F 21/00* (2013.01)
  *H04L 29/06* (2006.01)
  *G06F 21/34* (2013.01)
  *G06F 21/62* (2013.01)

(52) U.S. Cl.
  CPC ............... *G06F 21/34* (2013.01); *G06F 21/00* (2013.01)
  USPC .......... 726/9; 726/1; 726/4; 726/14; 713/150; 713/189; 709/201; 711/115

(58) Field of Classification Search
  CPC ........ G06F 21/53; G06F 21/46; G06F 21/445
  USPC ......... 726/9, 4, 14, 1; 713/189, 150; 711/115; 709/201
  See application file for complete search history.

(56) References Cited

U.S. PATENT DOCUMENTS

| | | | |
|---|---|---|---|
| 2007/0006294 A1* | 1/2007 | Hunter | 726/14 |
| 2007/0124536 A1* | 5/2007 | Carper | 711/115 |
| 2009/0198994 A1* | 8/2009 | Tan | 713/150 |
| 2013/0117804 A1* | 5/2013 | Chawla et al. | 726/1 |
| 2013/0268999 A1* | 10/2013 | Kiang et al. | 726/4 |
| 2014/0040343 A1* | 2/2014 | Nickolov et al. | 709/201 |

FOREIGN PATENT DOCUMENTS

WO    WO 2013188179 A2 * 12/2013 .............. H04L 67/10

OTHER PUBLICATIONS

Jang-Jaccard, J.; Manraj, A.; Nepal, S.; "Portable key management service for cloud storage"; Collaborative Computing: Networking, Applications and Worksharing (CollaborateCom), 2012 8th International Conference on Publication Year: Oct. 2012, pp. 147-156.*

* cited by examiner

*Primary Examiner* — Andrew Nalven
*Assistant Examiner* — Courtney Fields

(57) ABSTRACT

A method and system for providing secure access to a remote file is disclosed. According to one embodiment, a portable memory device containing a secure desktop is provided to a user. The user has a user device that removably accepts the portable memory device. The user is allowed to securely access a dedicated storage of the cloud storage system that is created at a request from an administrator. The secure desktop runs independently from a user desktop of the user device. The user's access to a local storage of the user device is blocked while the secure desktop is running.

17 Claims, 16 Drawing Sheets

SYSTEM AND METHOD FOR PROVIDING SECURE ACCESS TO A REMOTE FILE

CROSS-REFERENCE TO RELATED APPLICATIONS

This application claims priority under 35 U.S.C. §119 to Korean Patent Appl. No. 10-2012-0103656 entitled "System For Preventing Outflow of File and a Method Executing the System" and filed on Sep. 19, 2012, the disclosure of which is hereby incorporated by reference in its entirety.

FIELD

The present disclosure relates in general to the field of computer software and systems, and in particular, to a system and method for providing secure access to a remote file stored on a cloud storage system.

BACKGROUND

Cloud storage systems and services allow users to access files on a remote storage device, e.g., a cloud server, without temporal and spatial restrictions. Users can store files and easily access to their remote storage device over a network as if the files are on their local storage. Cloud storage systems also allow users to access files or folders from multiple devices and/or by multiple users. Cloud storage systems also provide back-up of stored files—the files are never lost even when the local storage fails because they are stored on the cloud server—and provide easy sharing and distribution of remote files with remote cloud users. Cloud storage systems overcome temporal and spatial restrictions of conventional file sharing and distribution mechanisms that require delivery of physical storage medium such as removable devices, USB drives, etc, or attachments of files in emails.

However, cloud storage systems have intrinsic vulnerability to malicious attacks by unauthorized users or mishandling of files even by authorized users. Providing secure access and safety of file sharing and distribution are key considerations in designing cloud services and systems.

U.S. Patent Application Pub. No. US 2007/0124536 ("'536 reference") proposes a system that provides a secure working environment using a virtual interface. The system contains a display, a host for executing a client application, and a token device connected to the host via the virtual interface. The token device contains a processor for executing a token device application. The token device application provides image data via the virtual interface to the client application that is executed and run by the host device. The client application displays on the display of the host device those images corresponding to the image data received from the token device.

The system of the '536 reference comprises both a host device and a token device that have independent operating systems and the processors in order to provide such an isolated and secure environment. The requirement for separate host and token devices, hence separate operating systems and processors, increases the overall cost. Furthermore, such a system is not adequate for secure file sharing and distribution over a distributed file storage system such as a cloud server.

SUMMARY

A method and system for providing secure access to a remote file is disclosed. According to one embodiment, a portable memory device containing a secure desktop is provided to a user. The user has a user device that removably accepts the portable memory device. The user is allowed to securely access a dedicated storage of the cloud storage system that is created at a request from an administrator. The secure desktop runs independently from a user desktop of the user device. The user's access to a local storage of the user device is blocked while the secure desktop is running.

It is an objective of the present invention to overcome problems of prior art file distribution and sharing systems and methods and to provide a system and method for providing secure access to remote files on a cloud storage system using a detachable memory device for enhanced portability and security.

It is another objective of the present invention to prevent unauthorized outflow of files from a cloud storage system by allowing access to the files only with a memory device and by processing file access and synchronization requests via a secure desktop that runs independently from the user's device.

It is yet another objective of the present invention to prevent an unauthorized access to a file on a cloud storage system by disabling file access calls such as copy, paste, print, screen dump, and save of the file to a medium other than a secure area of the memory device.

The above and other preferred features, including various novel details of implementation and combination of elements, will now be more particularly described with reference to the accompanying drawings and pointed out in the claims. It will be understood that the particular methods and circuits described herein are shown by way of illustration only and not as limitations. As will be understood by those skilled in the art, the principles and features described herein may be employed in various and numerous embodiments without departing from the scope of the invention.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
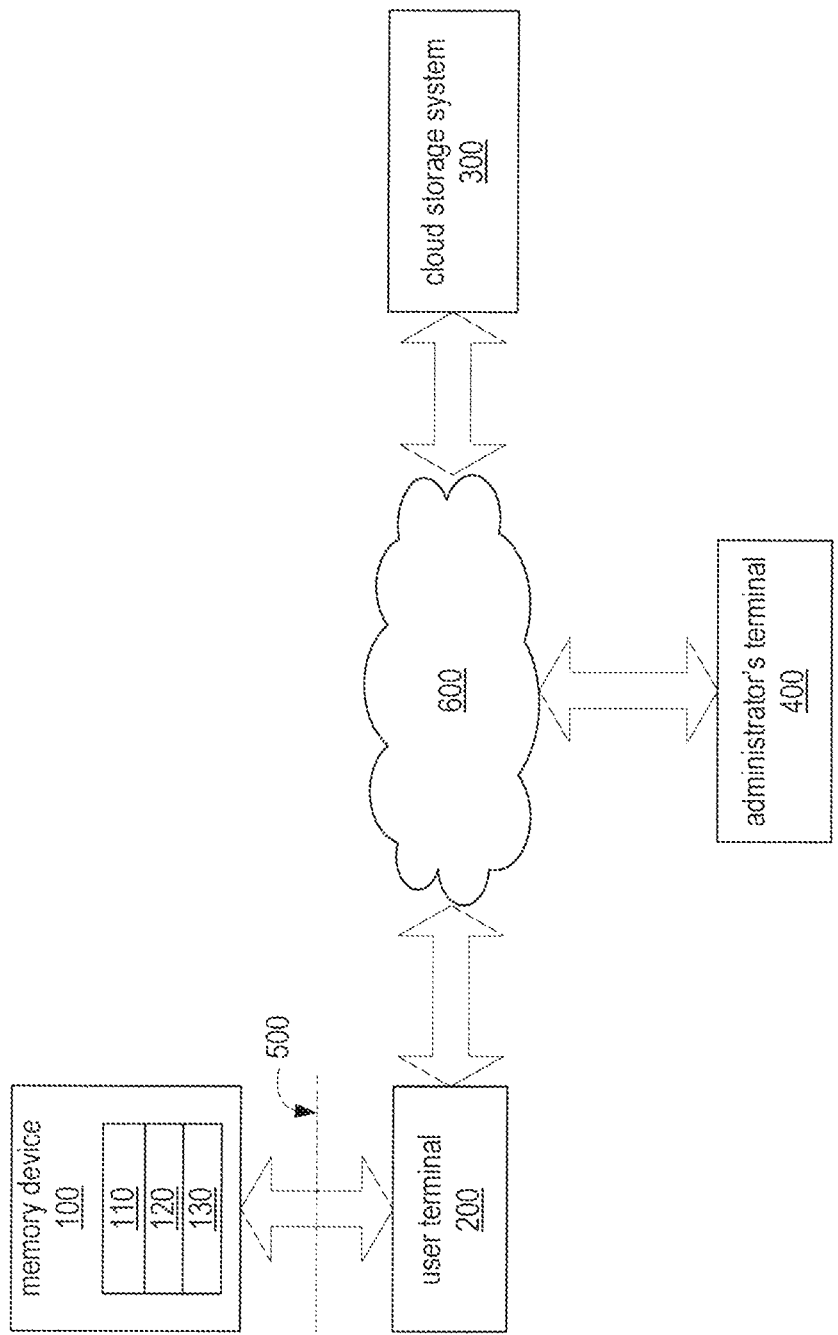
FIG. 1 illustrates an exemplary schematic diagram of the present system for providing secure access to a cloud storage system, according to one embodiment.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

A method and system for providing secure access to a remote file is disclosed. According to one embodiment, a portable memory device containing a secure desktop is provided to a user. The user has a user device that removably accepts the portable memory device. The user is allowed to securely access a dedicated storage of the cloud storage system that is created at a request from an administrator. The secure desktop runs independently from a user desktop of the user device. The user's access to a local storage of the user device is blocked while the secure desktop is running.

Each of the features and teachings disclosed herein can be utilized separately or in conjunction with other features and teachings to provide a method and system for managing the frequency of online advertisement placements. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the claims. Therefore, combinations of features disclosed in the following detailed description may not be necessary to practice the teachings in the broadest sense, and are instead taught merely to describe particularly representative examples of the present teachings.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

According to one embodiment, the present system and method provides a secure access to a cloud storage system using a memory device. The memory device stores proper instructions to connect to the cloud storage system and access files stored therein via a secure desktop, also referred to as portable desktop or virtual desktop. The secure desktop runs independently from the user device, and blocks, allows, or redirects system's generic application program interface (API) calls by hooking to limit user's access and handling of a remote file stored on the cloud storage system.

According to one embodiment, the secure desktop is run from the memory device. The memory device requires a password to access a general area where the user-executable secure desktop application resides. As the user logs in to the memory device, at least one process starts to hook the system's generic API calls related to file access, and the process monitors and intercepts (hooks) the user's unauthorized attempt to access the file such "save as," "copy," "cut," "paste" "screen dump," and "print." As a result, the user is granted only a limited access, for example, "view" and "local edit," to the remote file and is prohibited from any unauthorized attempt to access and share files with others.

The cloud storage system stores remote files to serve users with and manages information regarding authentication, registration, synchronization, and control of memory devices that are configured to be synchronized with the cloud storage system.

According to another embodiment, the memory device has 1) a general area for storing an application that is executed to run a secure desktop application to access and synchronize the local files stored therein with the cloud storage system, 2)

a secure area that is accessible only by the secure desktop and stores a copy of the remote files on the cloud storage system for local editing, and 3) a hidden area for storing authentication and user information to securely connect to the cloud storage system.

The memory device provides the cloud storage system at least one of, but not limited to, user information, synchronization information, and the authentication information for the secure desktop, and stores information received from the cloud storage system including at least one of but not limited to, control information for remote controlling of the memory device, authentication information for the memory device, shared file, and policy information.

The secure area of the memory device stores a local copy of remote files stored on the cloud storage system as encrypted using AES256 bit. The AES256 bit encryption may be performed on a hardware chip embedded in the memory device or by an encryption software stored in the memory device. Even if the local files are leaked out to an unintended user, such files are not readable or usable without decryption by the memory device.

The policy information includes at least one of, but not limited to, 1) user information for display before log-in to the cloud storage system as well as to the secure desktop application, 2) automatic synchronization information during login, and 3) automatic synchronization information during logout, and 4) number of attempts and time for synchronization when connection to the cloud storage system fails.

According to one embodiment, the present method comprises the steps of (a) providing a remote file from on the cloud storage over a network to the memory device that is connected to a user device; (b) providing a secure desktop that runs independently from the user device and allowing the user with limited access to the remote file via the secure desktop; and (c) synchronizing the cloud storage system and the memory device.

According to one embodiment, the present method further comprises the steps of registering a memory device, authenticating, facilitating synchronization between the cloud storage system and the memory device, and remotely managing and controlling the synchronized memory device.

According, to one embodiment, the above step of (a) further comprises the steps of authenticating the access right to the remote file received from the cloud storage, creating a dedicated storage on the memory device, and storing and managing authentication information, registration information, synchronization information, and control information on the dedicated storage.

The present system and method prevents unauthorized access to a remote file distributed in a cloud platform by allowing access to the remote file via a secure desktop that runs independently from a user device. Unauthorized attempts to access to a remote file are systematically prevented because the remote file can be accessed only when the secure desktop application is running with the memory device connected to the user device.

An administrator who wants to distribute or share a file with other users uploads the file to a cloud storage system, and the file is stored on a storage medium (e.g., cloud server, web hard, etc.). A cloud storage system stores one or more remote files on the storage medium, configures to provide the remote file to an intended user(s), and synchronizes the remote files on the users' device according to a predetermined schedule and frequency. For example, files are routinely synchronized every 5 minutes by an automatic back-up process while the user is editing the file. In another example, if configured so, files are synchronized when the user logs in or out the cloud storage system.

As a part of administrator's configuration for file distribution and/or sharing, the cloud storage system creates a storage space dedicated for a memory device to be synchronized. The memory device stores a local copy of the remote file and the user-specific information to allow the user to obtain secure access to the dedicate storage space on the cloud storage system. The memory device also stores the control information at a designated area to allow the administrator to remotely control and manage the memory device.

A user device refers to a computer system of the user and provides a communication protocol interface to the memory device. The memory device is plugged into the communication port of the user device and the user sets the password to gain access to the memory device. Using a memory device configuration program stored on the memory device, the user can reset or change the password. The administrator can remote reset the password when necessary, or completely destroy the data files stored in the memory device using a control file delivered and executed during synchronization. The memory device is portable and removably connected to the user device, and an example of such is a USB flash drive.

The administrator herein generally refers to the owner of a remote file or another user of the cloud storage system who stores and allows other users to access the remote file. Prior to distributing the remote file to a specified user, the administrator executes an administrator's application from his/her own device (administrator's device), and configures a memory device, and sends the memory device to the user. During the configuration of the memory device, the administrator's access token is stored in the hidden area of the memory device and a user's application program is stored in the general area of the memory device, respectively. The user executes the application program gains access to the cloud storage system using the access token. Once the user's application is connected the cloud storage system, synchronization occurs according to the predetermined schedule, and a copy of the remote file is temporarily copied to the secure area of the memory device. The copied file is locally processed by the user and is later synchronized with the remote file on the cloud storage according to the synchronization schedule or the user's command.

The administrator's device refers to the computer system that is connected to the cloud storage system locally or over a network and is used to perform a series of steps, for example, managing the administrator's account on the cloud storage system and configuring one or more memory devices.

According to one embodiment, the user device and the administrator's device are one of a desktop, a laptop, a tablet PC, a smartphone, a mobile computer, or a server that is connected wiredly or wirelessly to the cloud storage system over a network.

FIG. 1 illustrates an exemplary schematic diagram of the present system for providing secure access to a cloud storage system, according to one embodiment. System 1000 comprises user device 200, cloud storage system 300, administrator device 400 connected via network 600. Memory device 100, for example, a USB flash memory, is connected to user device 200 via interface port 500, for example, a USB port. User device 200 accesses a remote file from cloud storage system 300 over network 600 and stores a copy onto memory device 100 for local processing. According to one embodiment, memory device 100 contains a login program and a user-executable secure desktop application program. When memory device 100 is connected to user device 200, the login program is automatically executed. The user enters the password that was preset for memory device 100, and is able to see files and folders within memory device 100 including the secure desktop application. The user on user device 200 is given limited access to the remote fie because the remote file, therefore a local copy of the remote file is accessible only via the secure desktop that runs independently from user device 200.

Each memory device 100 has a general area 110, a secure area 120, and a hidden area 130. The general area 110 is accessible by a user without any restriction and contains the secure desktop application. The secure area 120 stores a copy of the remote file received from cloud storage system 300 during synchronization, and contains files that are accessible only by the secure desktop. The secure area 120 may store an encrypted copy of the remote file using AES 256 bit encryption. The hidden area 130 stores authentication information required for accessing the cloud storage system 300.

The memory device 100 receives a dedicated storage from cloud storage system 300, and synchronizes with the dedicated storage using the authentication and user information. To achieve independence from the user device and to prevent copying, saving and printing of the remote file onto the user device, temporary and working files of the remote file are forced to be stored on the memory device 100, and those files are synchronized with the dedicated storage of the cloud storage system 300 only via the secure desktop application. To launch the secure desktop, the user executes a user executable file (e.g., startup.exe) from the general area 110 of the memory device 100.

The secure desktop that runs on user device 200 provides a user with a conventional desktop-like user interface. The local processing and synchronization of the remote file is made possible only via the secure desktop when the memory device connected to user device 200. Therefore, an unauthorized attempt to access the remote file, such as copy, cut, save as, and print other than the administrator's permission is systematically blocked because the secure desktop runs independently from user device 200 prohibiting the user to access local storage of the user device. The user is given only the authorized access to cloud storage system 300 as the memory device is configured, for example, viewing and editing the remote file but not copying, saving as, screen dump, printing, etc.

Prior to the first time use of a memory device 100, the administrator configures the memory device 100 with the access information to the cloud storage system 300 and user information of the intended user. During the configuration of the memory device 100, the access information to the cloud storage system 300 is stored on the hidden area 130 of the memory device 100. The administrator runs an administrator's configuration application from administrator's device 400. The configuration application may be distributed to the administrator on a portable medium or available for download from the Internet. According to one embodiment, the administrator is required to plug a token (administrator's token different from the memory device 100) in a UST port of the administrator's device 400 to be able to properly configure the memory device 100. According to another embodiment, the administrator may not need any physical hardware to properly configure memory devices and manage a plurality of users through the cloud storage system 300. It is understood that the use of an administrator's token is for convenience and added security, but is not considered to be a limitation of the present invention. The requirement of a token provides several advantages. For example, the administrator gains automatic access to his/her account without entering his/her ID and password (when the memory device is configured so), and the administrator's role can be switched to another person only with the administrator's token and its password (without revealing the account ID and password).

The administrator manages his/her account on the cloud storage system 300 as well as a plurality of memory devices 100. According to one embodiment, such memory devices are Secudrive® manufactured by Brainzsquare Co., LTD. of Republic of Korea. When the administrator's account is properly configured, the access information to the cloud storage system 300 is stored on the token, and the hierarchical folders are created on the administrator's account for the memory device management. The processes for administrator/user account set-up and file management schemes are discussed in further detail below.

When the administrator's configuration application is first run, the administrator is asked to enter a password or pin code for the connected token to continue. The administrator's token, in one embodiment, is a USB token with an associated password, and it stores the administrator's account log in information to cloud storage system 300.

The administrator's token provides improved security and an additional layer of authentication yet providing flexibility of switching administrator's role from one person to another without requiring sharing or changing the administrator's account ID and password on cloud storage system 300. For example, one administrator's account may be associated with an administrator token. The administrator's login information to the cloud storage system may not need to be transferred to a new administrator's account because the login information is securely stored in the administrator's token. The new administrator gains a secure access to the original administrator's account simply by entering the pin code set by the original administrator, then access to the administrator's account is automatically granted. The requirement for a physical hardware, i.e., a USB token, and a matching pin code provides both security and flexibility for managing the administrator's account. However, as discussed above, it is noted that the requirement for an administrator's token is not considered to be a limitation of the present invention. The administrator's account may be accessed using a conventional password to cloud storage system 300 without requiring a hardware token.

Administrator's device 400 requests authentication for the administrator's configuration application to cloud storage system 300. In response, cloud storage system 300 sends the results of administrator's request for the authentication. If the authentication was approved, the administrator's device stores the received authentication information on the administrator's token. The authentication information is later used to configure a memory device. During the configuration of the memory device, the authentication information is stored on the hidden area 130 of memory device 100 along with the user information of a specified user to allow the user to access the storage on cloud storage system 300 dedicated for the specified user.

According to one embodiment, the present system and method provides an administrator's configuration application program for configuring his/her account on the cloud storage system 300 and memory devices 100. The administrator's configuration application needs to be pre-approved by the cloud storage system/service provider to be able to configure a memory device for a remote user.

According to one embodiment, the cloud service provider is Dropbox, Inc of San Francisco, Calif., and the cloud storage system is DropBox®. Dropbox users installs a client program on his/her PC, and it creates a Dropbox folder. Dropbox service allows users to share files conveniently and concurrently with other users. However, the shared files could be leaked by other users on purpose or by mistake. The present system and method provides a solution to protect intentional data leakage. A secure desktop is required to run to be able to access the administrator's Dropbox folder and files therein. The secure desktop allows a user to synchronize the file in Dropbox to his/her memory device while the secure desktop is running. The secure desktop runs in isolation and independently from the user's computer. The user is allowed to work on the shared files locally only via the secure desktop and the associated memory device. After completing tasks, the remote files are synchronized with the Dropbox folder.

In order to configure a memory device 100 for file sharing as discussed above, administrator's device 400 first sends a request to the cloud storage system 300 to create a dedicated storage specific for the designated memory device 100. The dedicated storage is reserved for the associated memory device 100, and those stored files are synchronized with the secure area 120 and hidden area 130 of the memory device 100.

According to one embodiment, the present system and methods allows access to one user account (e.g., administrator's account) of cloud storage system 300 by multiple users with the same account credential. From the cloud server's point of view, only one user logs in, sometimes simultaneously from different clients at a time because the administrator and every user uses the same administrator's login credential. The one (administrator) user's account is configured to provide uniquely allocated storage space to each of the memory devices under the administrator's account. Due to this hierarchical folder structure, multiple users can be given different storage space under a single user's account, and they are not necessarily aware of other users who happen to share the same user's account.

Referring to FIG. 1, user device 200 and administrator's device 400 are shown to be structurally and functionally separate. However, it is understood that the user device 200 and administrator's device 400 may be the same device to perform their above-described functions without deviating from the scope and spirit of the present invention.

Figure 2:
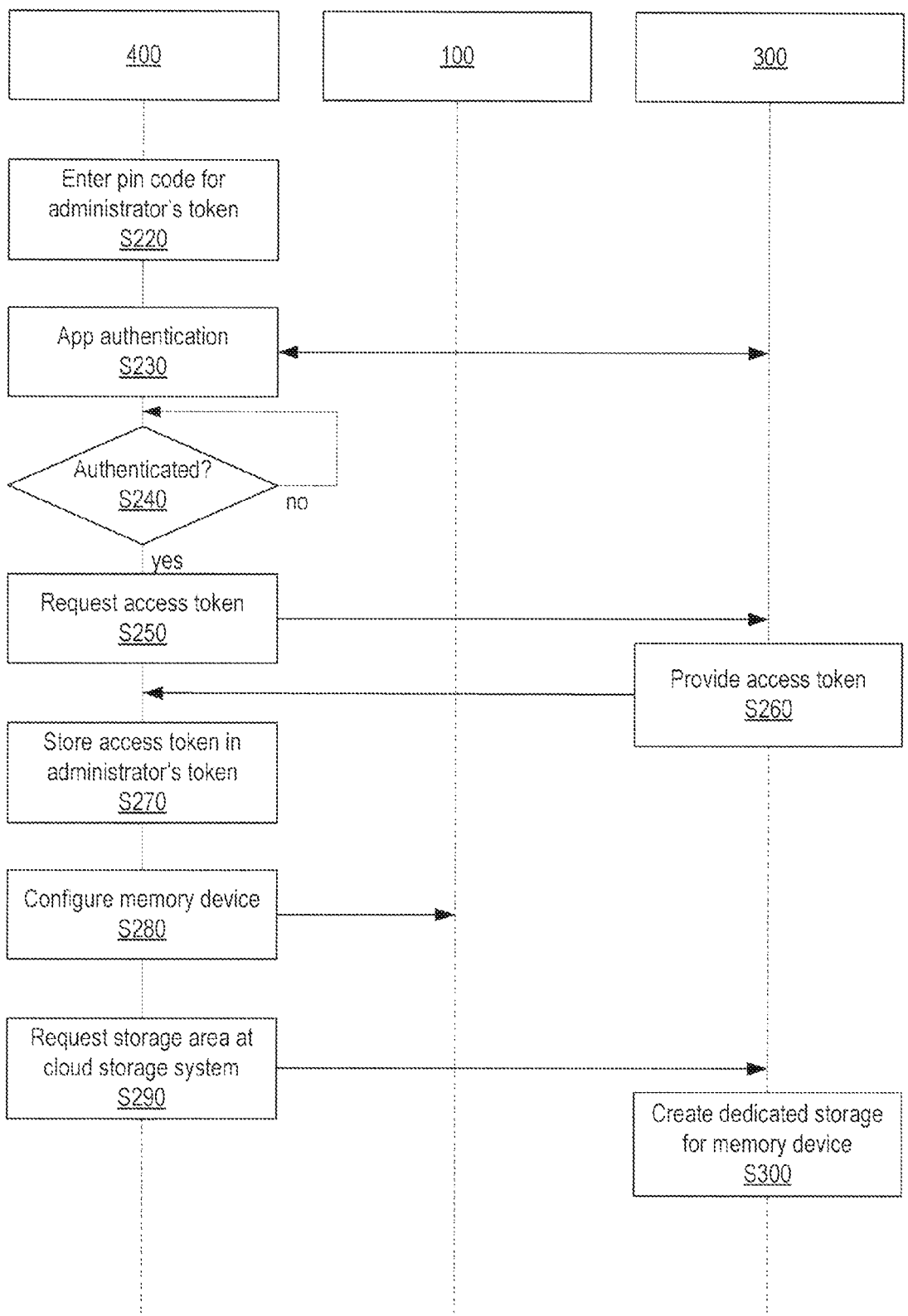
FIG. 2 is an exemplary schematic diagram for configuring a memory device to synchronize with a cloud storage system, according to one embodiment.
Figure 3:
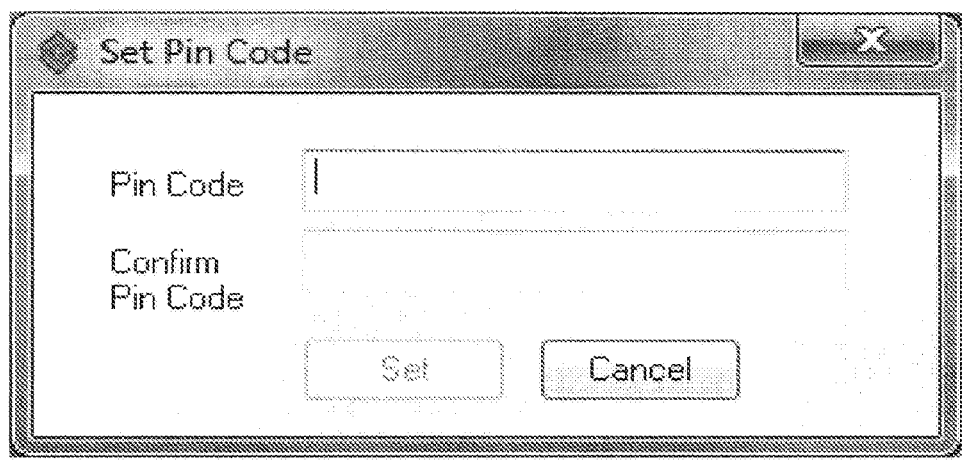
FIG. 3 illustrates an exemplary interface for an administrator to set a pin code to a token, according to one embodiment.

FIG. 2 is an exemplary schematic diagram for configuring a memory device to synchronize with a cloud storage system, according to one embodiment. The administrator has a token plugged into the administrator's device 400 and runs a configuration application. For the first time log-in, the administrator is asked to create a pin code for the administrator's token (S220), if the pin code is already set for the particular token, the administrator enters the previously-set pin code to continue start the configuration application. In one embodiment, the administrator's token is a USB token and stores the administrator's account information on the cloud storage system 300. FIG. 3 illustrates an exemplary interface for an administrator to set a pin code for a token, according to one embodiment.

Figure 4:
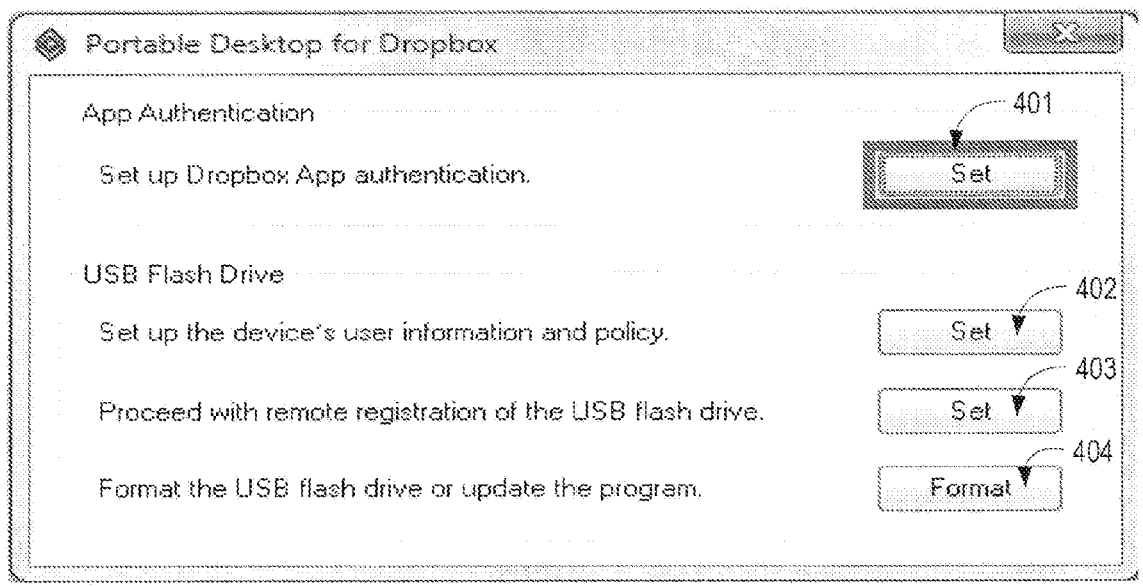
FIG. 4 illustrates an exemplary menu of an administrator's configuration application, according to one embodiment.

Once the pin code for the administrator's token is successfully set or entered, the main menu of the configuration application is displayed on the administrator's device 400. FIG. 4 illustrates an exemplary menu of the administrator's configuration application. The administrator starts configuring the administrator's an account at the cloud storage system 300 by clicking on button 401. The configuration application sends a request to the cloud storages system 300 to authenticate the application (S230). In response, the cloud storage system 300 creates and sends an authentication URL back to the configuration application. The authentication URL is only valid for a predetermined time.

Figure 5:
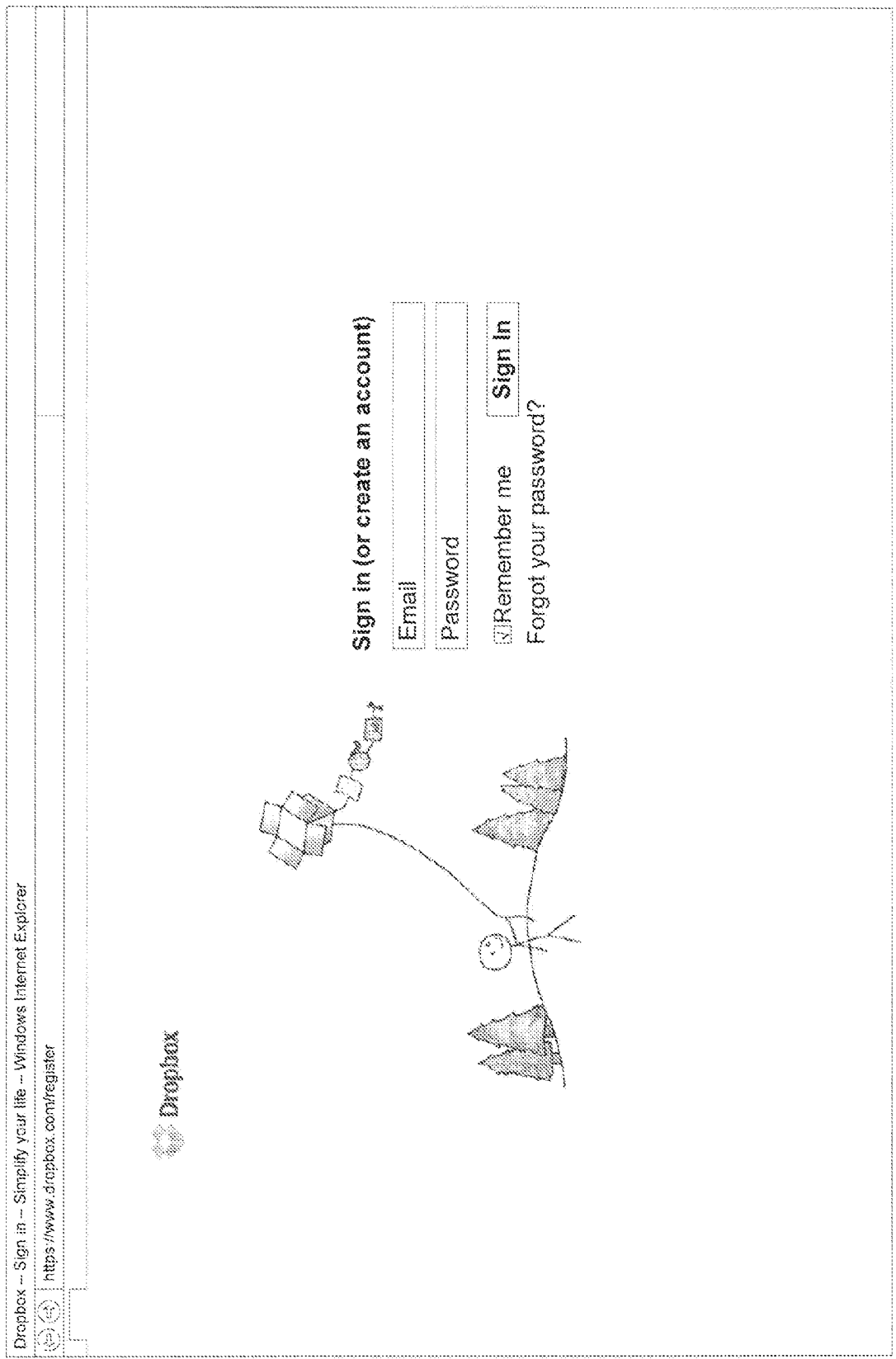
FIG. 5 illustrates a user interface for an exemplary authentication URL provided by the cloud storage system, according to one embodiment.

FIG. 5 illustrates a user interface for an exemplary authentication URL provided by the cloud storage system, according to one embodiment. Using his/her account credential, the administrator signs in to the cloud storages system 300 from the authentication URL. The authentication for the application is necessary in order to properly configure the administrator's account and allow access to the account by one or more users having a memory device that is configured for secure access according to the present subject matter. Once authentication completed for the first time, and no additional authentication is necessary because the result of authentication is stored on the administrator's token that is later reused. The administrator logs into the account via the authentication URL during the predetermined period of time after the authentication URL is created and sent from the cloud storage system.

Figure 6:
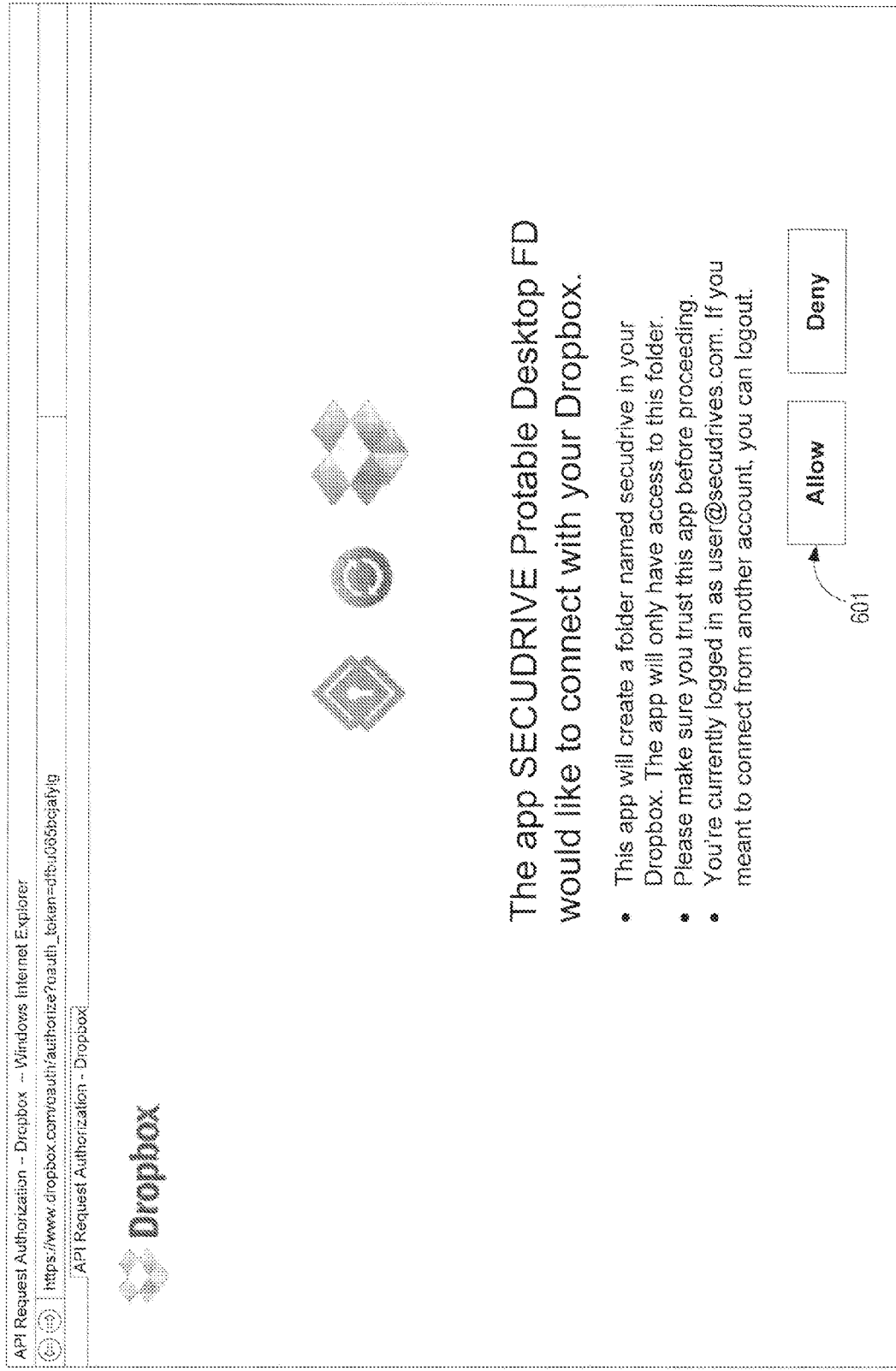
FIG. 6 illustrates an exemplary user interface provided by the cloud storage system during an authentication process, according to one embodiment.

After a successful login, the administrator is asked to confirm whether his/her authentication request is indeed intended or not. FIG. 6 illustrates an exemplary user interface provided by the cloud storage system during the authentication process, according to one embodiment. The administrator clicks allow button 601 to continue. Then, the cloud storage system configures the administrator's account and creates a folder dedicated for the requested application, for example, "secudrive."

Figure 7:
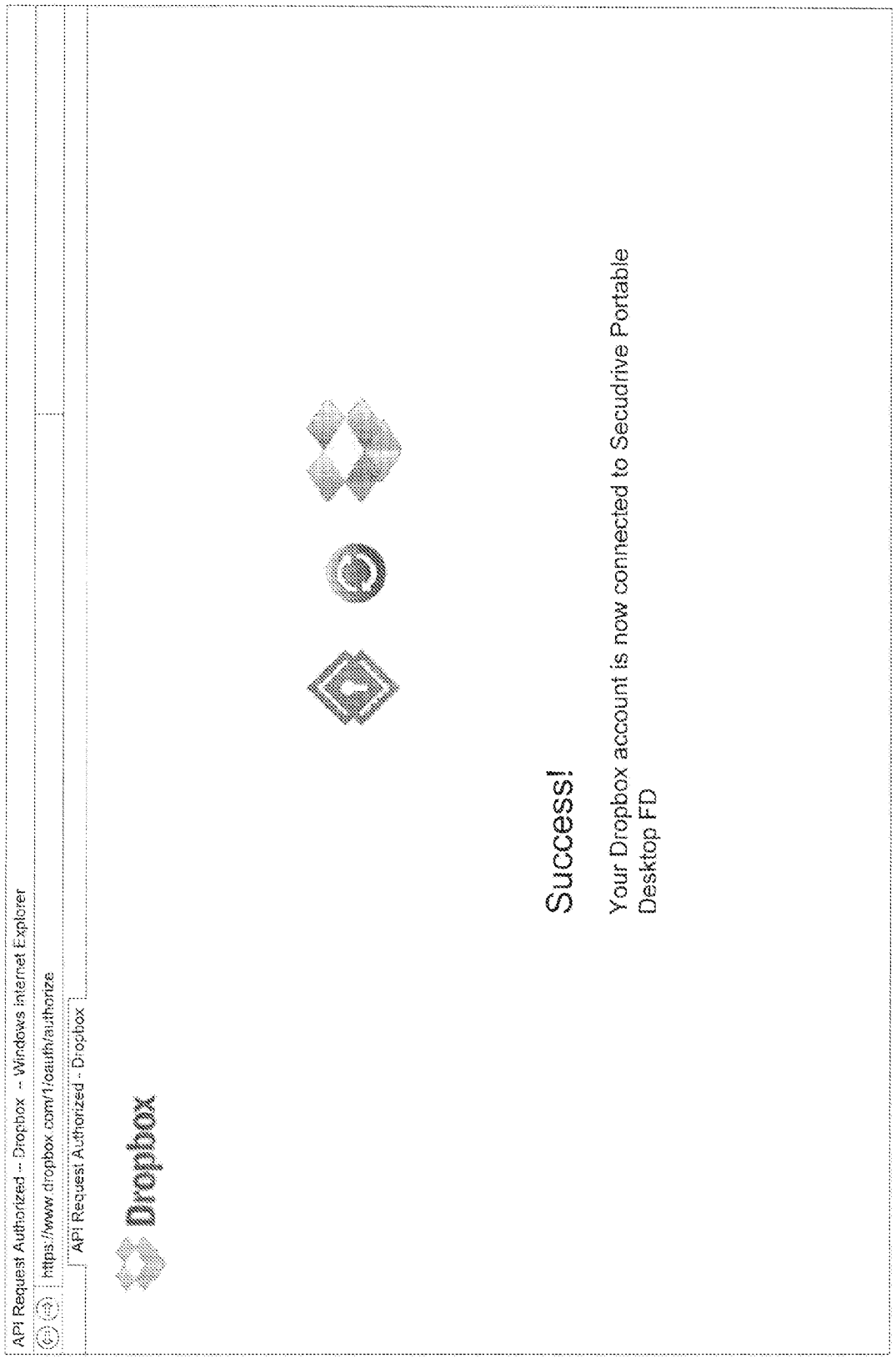
FIG. 7 illustrates an exemplary web browser interface provided by the cloud storages system confirming authentication of the requested application, according to one embodiment.
Figure 8:
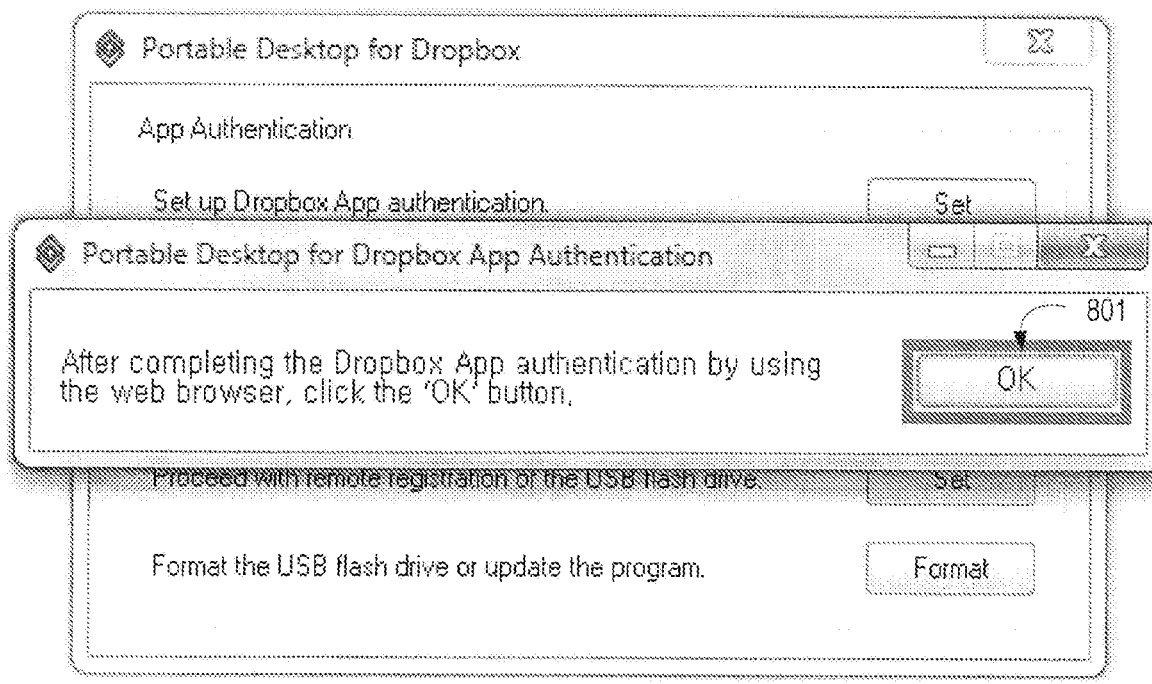
FIG. 8 illustrates an exemplary user interface for confirming authentication of the requested application on the administrator's device, according to one embodiment.

The cloud storage system 300 finally approves the administrator's authentication request and notifies the confirmation on the administrator's device. FIG. 7 illustrates an exemplary web browser interface provided by the cloud storages system confirming authentication of the requested application, according to one embodiment. The administrator approves the authentication of the requested application to complete the application authentication process. FIG. 8 illustrates an exemplary user interface for confirming authentication of the requested application on the administrator's device, according to one embodiment.

Once the administrator's authentication request is successfully approved and confirmed as illustrates in FIGS. 6-8 (S240), the configuration application requests the cloud storage system an access token (S250). According to one embodiment, the access token is sent to the cloud storage system in OAuth protocol. OAuth protocol is commonly used in the art and allows users to share their photos, videos, etc. stored on one site with another site without having to hand out their credentials. By storing the access token locally on the administrator's token, the administrator can access the administrator's account on the cloud storage system without supplying the ID and password. Similarly, as it will be discussed in further detail below, other users are given a memory device that stores the access token so that they access the administrator's account on the cloud storage system without supplying the administrator's ID and password.

Figure 9:
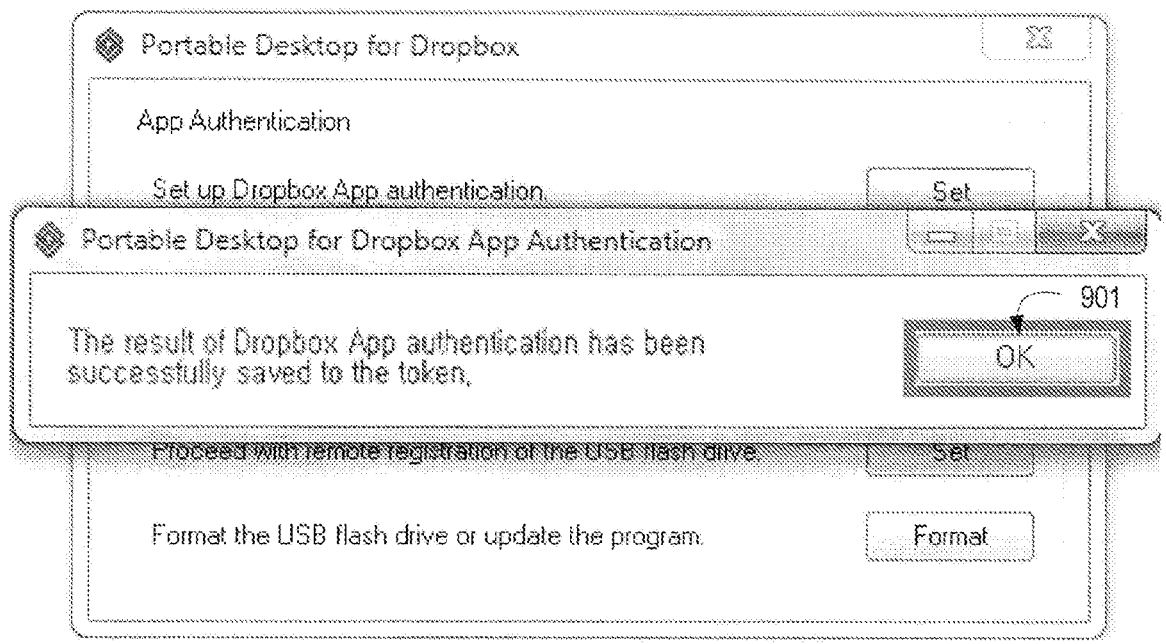
FIG. 9 illustrates an exemplary web browser interface confirming saving of the access token on the administrator's token, according to one embodiment.
Figure 10:
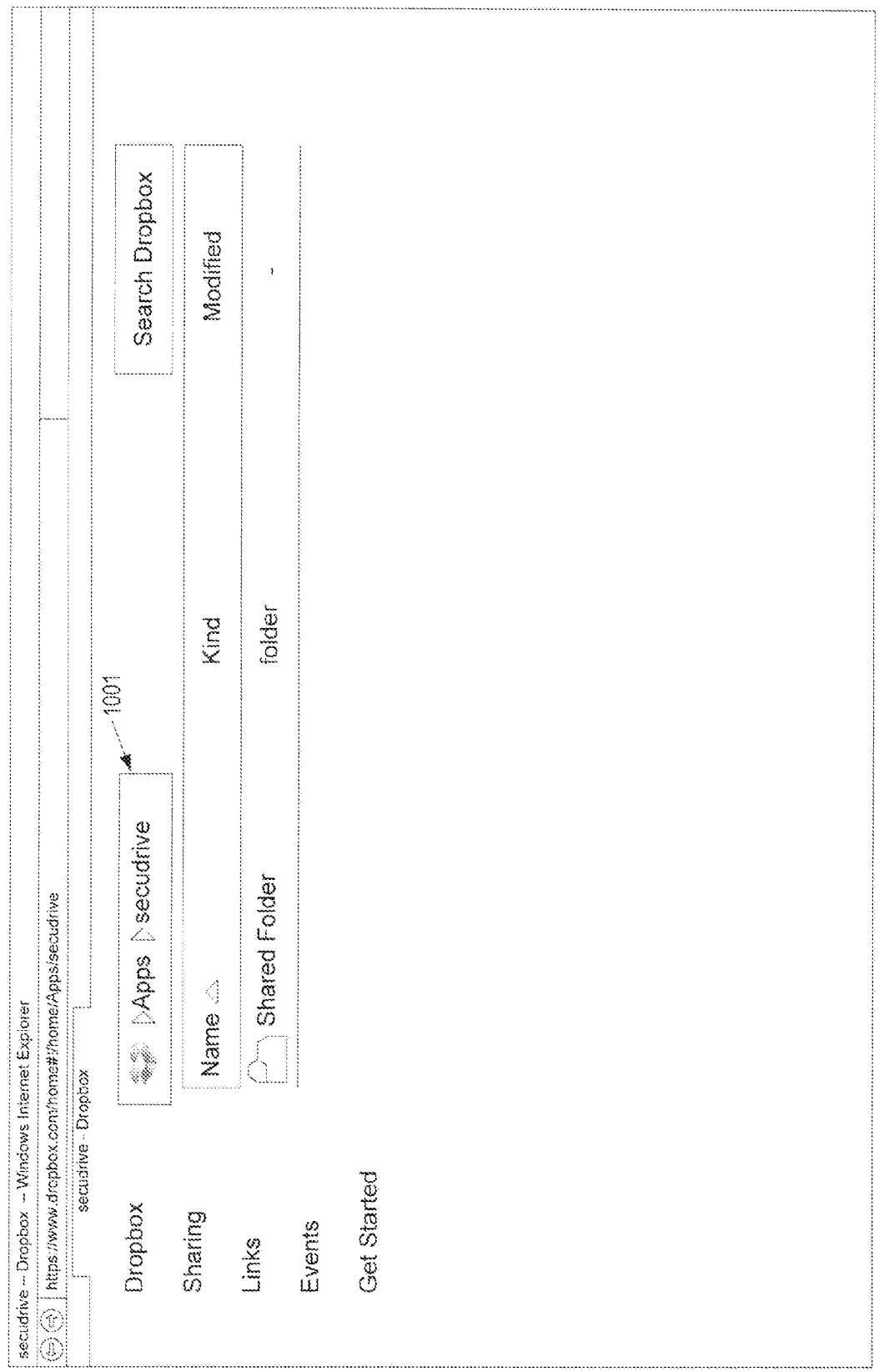
FIG. 10 illustrates a newly created application-specific folder under the administrator's account on the cloud storage system, according to one embodiment.

The cloud storages system 300 creates and sends the access token for the administrator's account back to the administrator's device 400 (S260). The access token is stored on the administrator token (S270). FIG. 9 illustrates an exemplary web browser interface confirming saving of the access token on the administrator's token, according to one embodiment. The cloud storage system 300 also creates an application-specific folder. FIG. 10 illustrates a newly created application-specific folder under the administrator's account on the cloud storage system, according to one embodiment. The folder 1001 named "secudrive" is created in the administrator's account. One or more sub folders can be created under this folder for each of memory devices to be configured as explained below.

Once the administrator's token is properly configured, the administrator is allowed to access the administrator's account (or other accounts that are configured properly) on the cloud storage system 300 by simply entering the pin code for the token (S220). Because the access token is now stored on the token, the administrator's configuration application allows the administrator (or whoever has the token and pin code) to automatically log in to the account on the cloud storage system without providing the account information and password. The administrator's account information is effectively transformed to a more secure yet flexible combination, i.e., token and pin code. This allows for easy access to the account on the cloud storage system. A person who is given the administrator's token and the pin code combination can be a new administrator without having to share the account information and password on the cloud storages system. In one embodiment, a batch file is automatically run when the token is plugged into the administrator's device. The batch file allows the administrator to enter the pin code for the token, and then automatically starts the configuration application.

From the configuration application, the administrator is allowed to configure one or more memory devices 100. Those memory devices are distributed to designated users. The administrator can properly configure the memory devices and remotely control and manage the access privileges of the users. The same access token that is received from the cloud storage system 300 and stored on the administrator's token is also stored each of the memory devices in the hidden area. The hidden area of a memory device is accessible only by a user's application that is allowed to run only from the memory device.

In order to configure a memory device, the administrator plugs it on a USB port of the administrator's device and selects the button 402 as shown in FIG. 4. The configuration application requests the cloud storage system to create a dedicated storage synchronizable with the Secure area and hidden area of the memory device. The dedicated storage stores files for the designated user to access. In one embodiment, a unique folder is created for each memory device with a unique identifier for the memory device such as the serial number and the user's ID.

Figure 11:
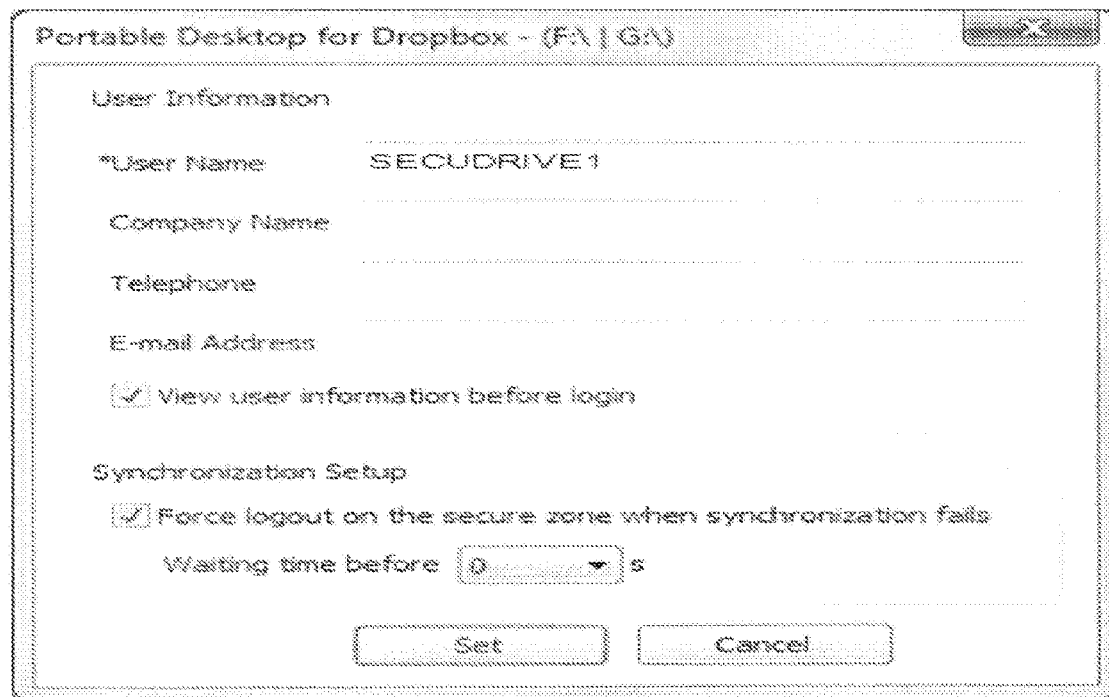
FIGS. 11 and 12 illustrate an exemplary interface for configuring synchronization options for a memory device, according to one embodiment.

According to one embodiment, the administrator can configure a memory device remotely. A user who has an unconfigured memory device runs a remote registration program to request to configure the memory device along with the user information as shown in FIG. 11. The remote registration program creates a remote registration request file including the serial number of the memory device and the user information. The remote registration request file is delivered to the administrator in an appropriate manner, for example, by email.

The administrator runs the configuration applications and selects the button 403 for remote configuration of the requested memory device. Using the information stored in the remote registration request file, the configuration program creates a remote registration approval file, and it is sent back to the requesting user. The remote registration approval file includes the serial number of the memory device, user information, the access token, a CES encryption key, encryption option, the serial number of the token, etc. Next time the user logs in using the memory device, the registration process continues with the remote registration approval file, and using the information stored in the remote registration approval file, the remote registration process completes.

During the configuration of the memory device, the user information is stored in the hidden area of the memory device. The user's information is used to identify the associated dedicated storage on the cloud storage system 300 and to synchronize. The user information includes, but not is not limited to, user name, user ID, company, telephone number, email, and any combination thereof that represents the user's unique identity.

Figure 12:
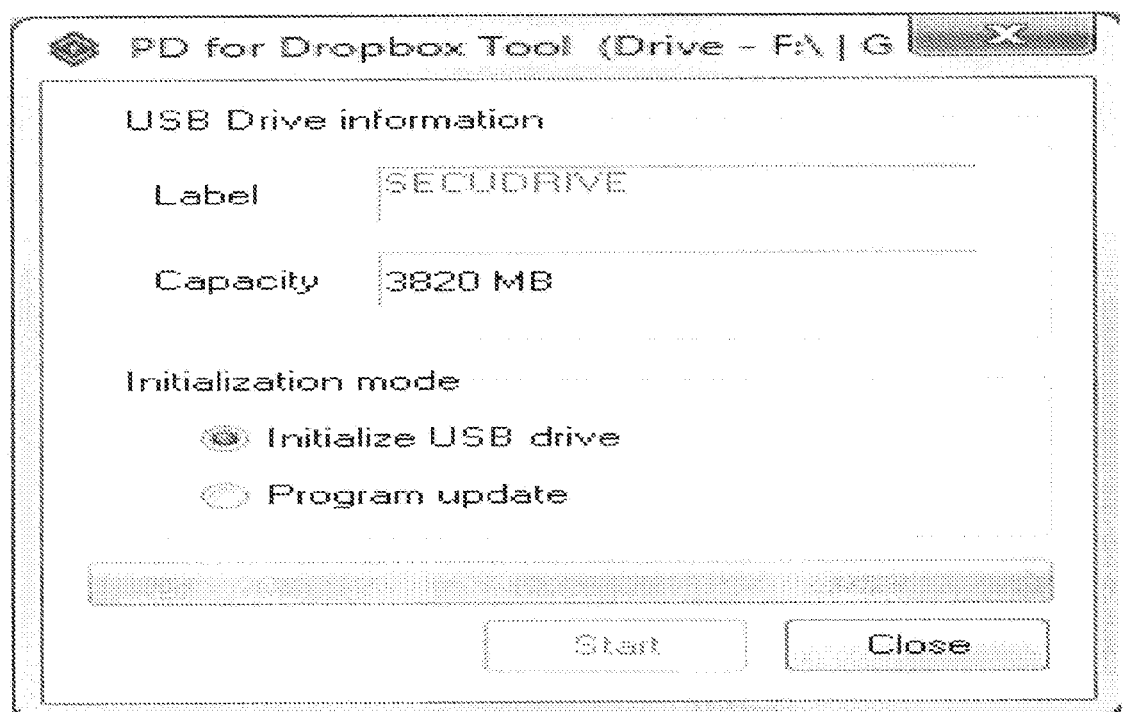

The administrator's configuration application also configures the synchronization information necessary for synchronizing a memory device and the associated dedicated storage. Synchronization options can be set to enable/disable automatic synchronization during log-in and/or log-out. FIGS. 11 and 12 illustrate an exemplary interface for configuring synchronization options for a memory device, according to one embodiment. The user information including the user name, company, telephone number, and email address is entered. Other options are available such as the time to force logout when a number of synchronization attempts fails, the initialization mode for the memory device, etc.

According to one embodiment, the dedicated storage to be synchronized with a memory device is created with a unique identifier. For example, the unique identifier is a character string combining the serial number of the memory device and a user name. If a different user name is used, a different dedicated storage can be created even if the same memory device is used. In this case, multiple users can use the same memory device, and each of those users can access to a unique storage on the cloud storage system. Similarly, the same user can have a different storage space on the cloud storage system when using a different memory device.

Figure 13:
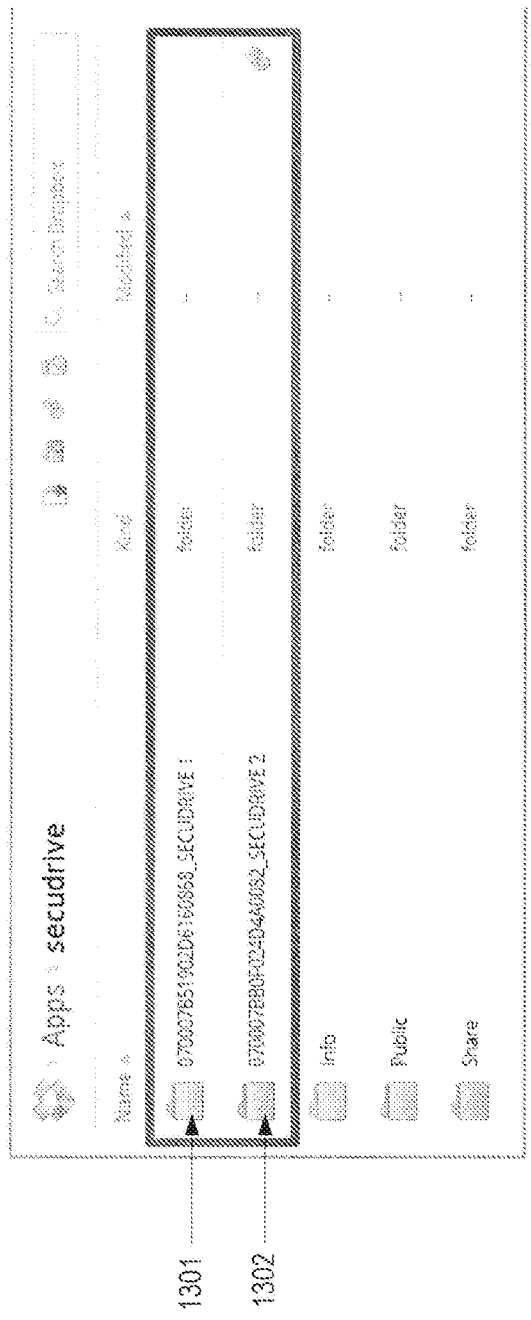
FIG. 13 illustrates exemplary dedicated storage spaces created in the cloud storage system, according to one embodiment.

FIG. 13 illustrates exemplary dedicated storage spaces created hi the cloud storage system, according to one embodiment. Folders 1301 and 1302 are created for two different users, "SECUDRIVE 1" and "SECUDRIVE 2," each on different memory devices. At least one sub folder is created by default, for example, control folder, data folder, and log folder.

Figure 14:
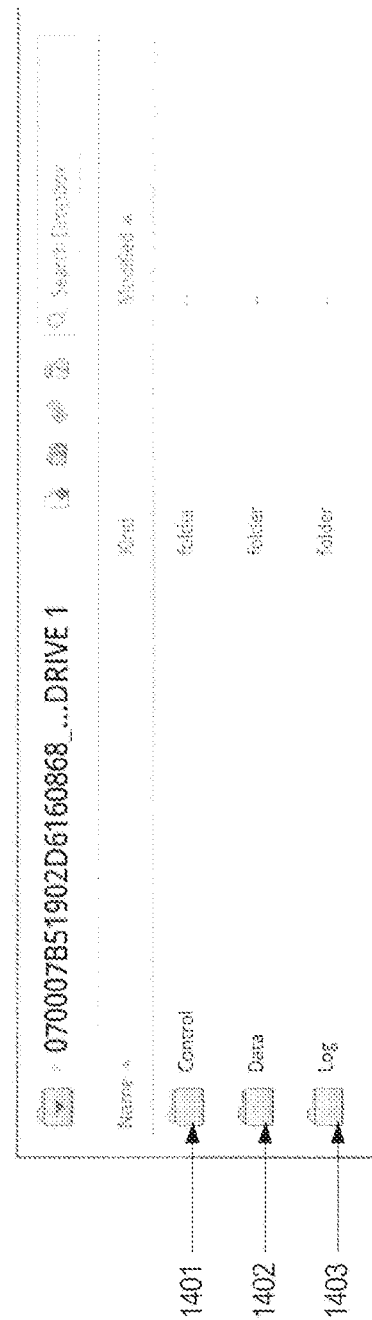
FIG. 14 illustrates exemplary subfolders created by default, according to one embodiment.

FIG. 14 illustrates exemplary subfolders created by default, according to one embodiment. For example, those subfolders dedicated for a memory device and the user using the memory device contains control folder 1401, data folder 1402, and log folder 1403.

The data folder 1402 contains remote files that are to be synchronized with the associated memory device. During synchronization, the remote files in the data folder 1402 are copied to the secure area 120 of the memory device. The copied files are locally processed on the secure desktop of the user device. The cloud storage system provides a version management/control capability. When requested by the user, older files stored on the user's dedicated storage can be restored using the version management software.

The control folder 1401 stores command files for remotely controlling the associated memory device 100. For example, a "destroy" file or the like is placed in the control folder to destruct, reformat, and delete the files copied in the memory device 100 or completely reset the memory device to an configured state. The destroy feature is useful when the administrator desires a specified user to stop accessing files from the cloud storage system or when a memory device is lost. After the login, the cloud storage system detects the presence of the control file (e.g., destroy) and subsequently performs the intended actions on the files in the memory device. The remote control may be performed online when the memory device is connected to the cloud storage system, and a synchronization occurs.

Once the memory device is successfully destructed, a message is displayed to the user notifying that memory device is destructed. A re-initialization or reconfiguration of the memory device may be required to be able to reuse the memory device. The re-initialization may be performed remotely in a similar way as the destruction process.

The log folder 1403 stores usage information of the associated memory device. The usage information includes, but is not limited to, log-in and log-out records, file synchronization logs, file creation and deletion history, and any other log information particular the associated user and memory device. The usage information may be recovered by the cloud storage system during synchronization for the administrator's review.

Figure 15:
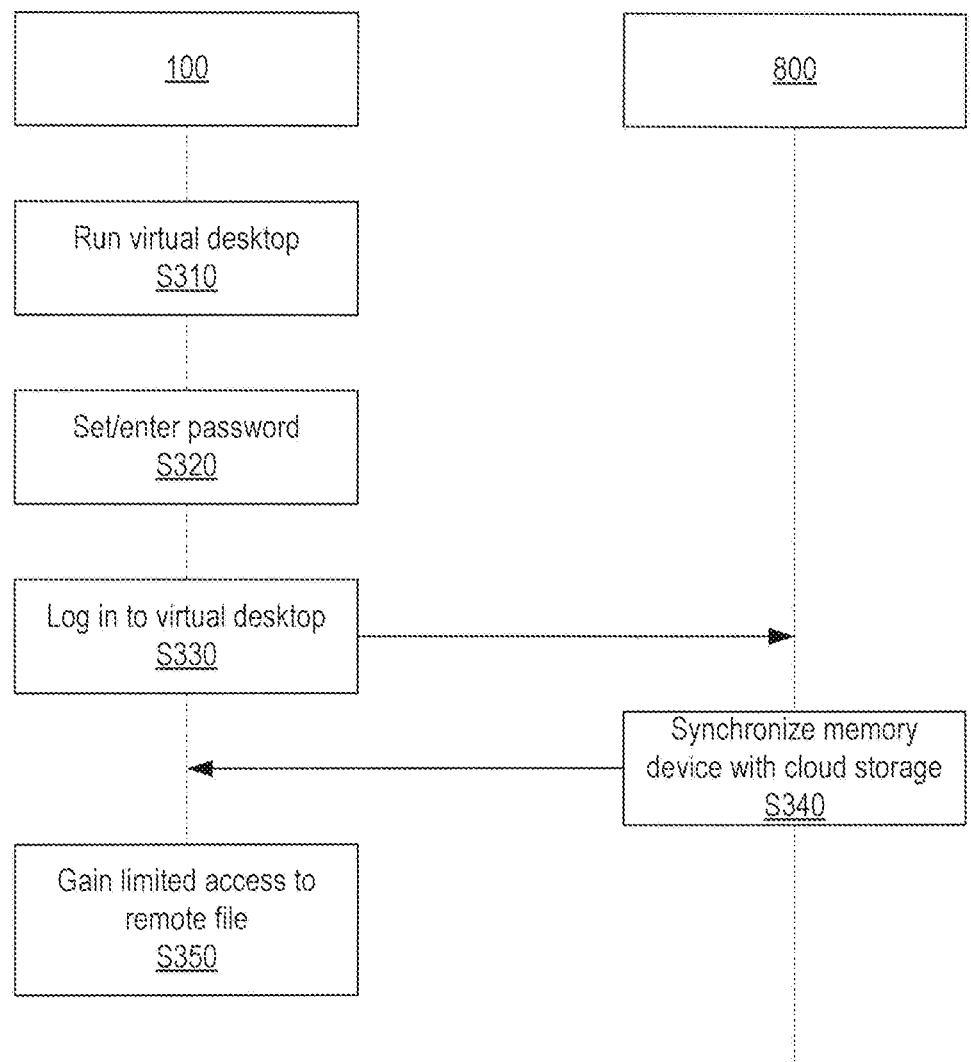
FIG. 15 illustrates an exemplary flow chart for synchronizing a memory device with a cloud storage system, according to one embodiment.

FIG. 15 illustrates an exemplary flow chart for synchronizing a memory device with a cloud storage system, according to one embodiment. The user plugs in a properly configured memory device into a USB port of the user device and runs a secure desktop from the general area of the memory device (S310). The secure desktop provides the user a desk-top like environment to allow secure access to the remote files on the cloud storage system.

Figure 16:
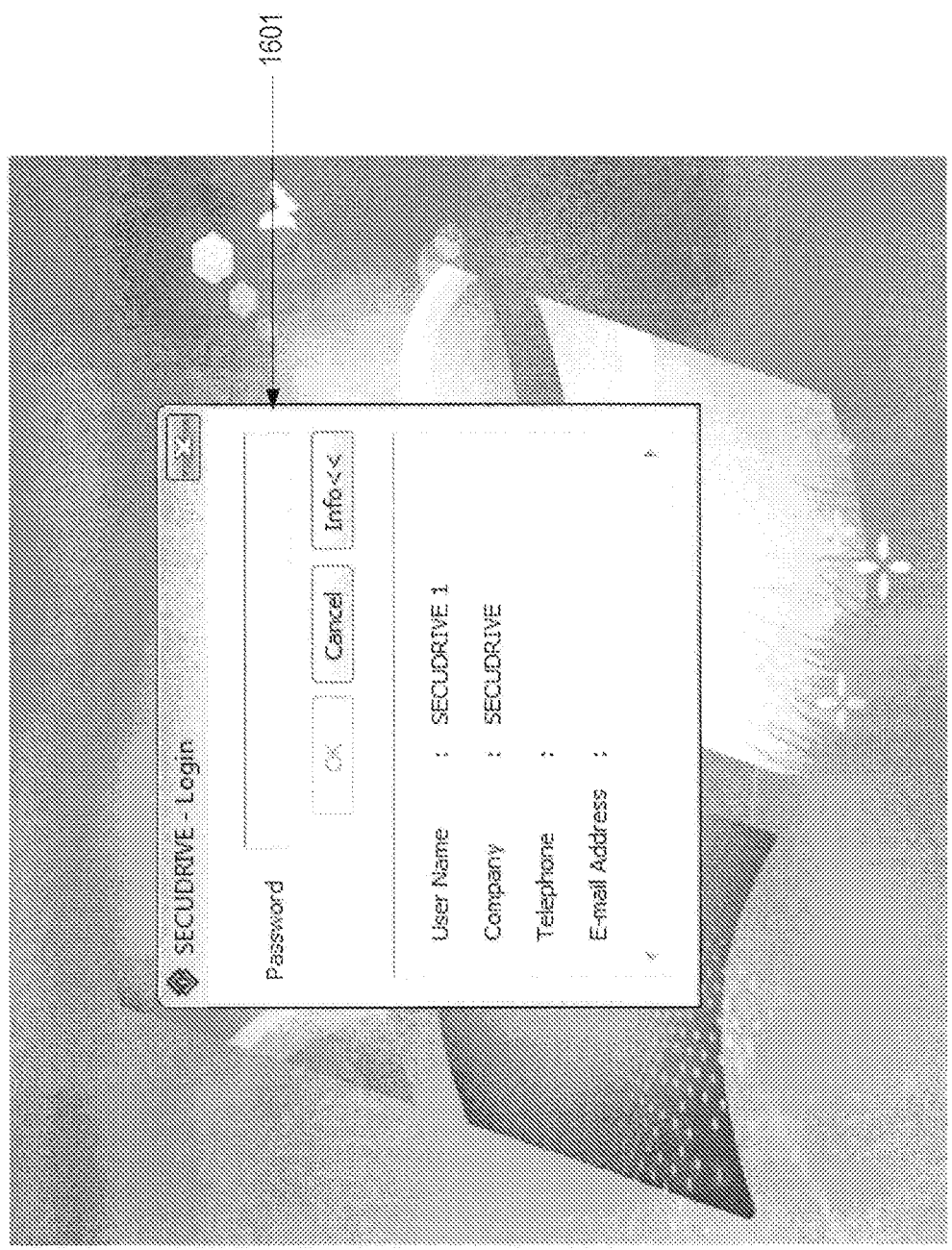
FIG. 16 illustrates an exemplary interface for a secure desktop, according to one embodiment.

FIG. 16 illustrates an exemplary interface for a secure desktop, according to one embodiment. The first time when the user uses the memory device, the user is required to set a password; otherwise the user enters the previously-set password (S320). Once the user properly sets or enters the password on the window 1601, the user can see the visible folder (s) of the memory device. The user-executable secure desktop application (e.g., start.exe) is included in the general area of the memory device during configuration. The user launches the secure desktop (S330). Since the memory device already stores the access token in the hidden area, the secure desktop automatically logs the user into the cloud storage system.

After the login, the secure desktop downloads the policy/control file(s) from the control folder of the cloud storage system. If the policy file includes a remote "destroy" file, the secure desktop destroys the local copies of the remote files in the memory device.

The secure desktop provides "hooking" to the system APIs of the user's device. In one embodiment, a dynamic link library (DLL), SDPDControl.dll, is run to hook the Win32 APIs of the user's desktop running Windows 7. The hooking functions intercept or replace Win32 APIs, calling the original APIs before or after execution of its own. These hooking functions modify and/or extend the behavior of the users system's default UI and API. After the hooking using the DLL, a secure desktop management process is started to monitor the user's inputs on the secure desktop. For example, the user attempts to copy a remote file to a local drive. Such an unauthorized attempt is intercepted by the secure desktop management process. The secure desktop management process determines to allow, block, and redirect the system's API functions.

After the secure desktop starts, the temporary folder of Window's Explorer of the user's desktop is redirected to a temporary folder in the memory device. Temporary files created while the secure desktop is running are saved on the secure area of the memory device, not on the temporary folder of the user's desktop. Those temporary files are becomes unavailable after the user logs out the secure desktop, and the access to the memory device is blocked without rerunning the desktop. In another example, when the user tries to access a local volume of the user's desktop to save a Word document, the secure desktop management process blocks the corresponding system's API functions. When synchronization occurs, the local files in the memory device are compared with the corresponding remote files in the dedicated storage of the cloud storage system and synchronized accordingly (S340 and S350).

The user is allowed to view and edit the remote file via the secure desktop. The secure desktop runs independently from the user device; the remote files are accessible only via the secure desktop, and the user cannot access the local drive(s) of the user's desktop (e.g., C drive, unconfigured USB memory) and peripherals of the user device other than the memory device where the secure desktop is running from. Once the secure desktop is launched, the user is prohibited from accessing the local drive(s) and peripherals until the user logs out the secure desktop.

Figure 17:
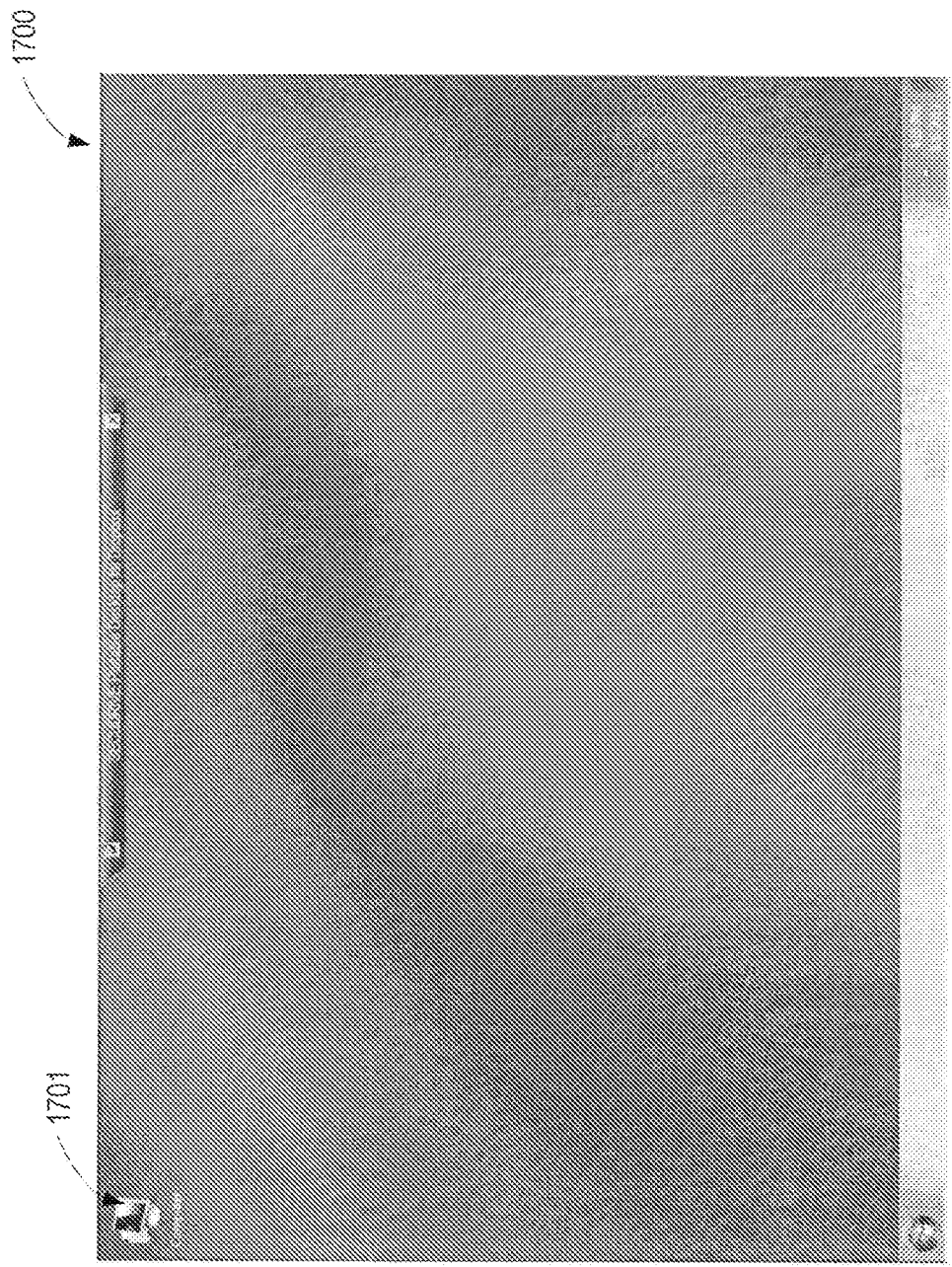
FIGS. 17 and 18 illustrate an exemplary graphical user interface for the secure desktop provided after the login, according to one embodiment.
Figure 18:
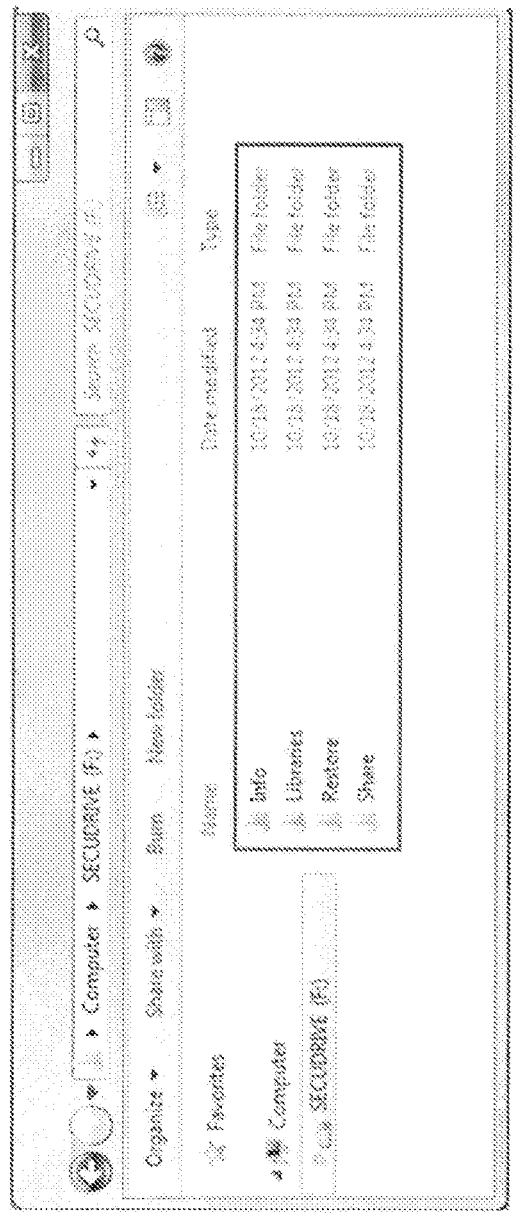

FIGS. 17 and 18 illustrate an exemplary graphical user interface for the secure desktop, according to one embodiment. The secure desktop 1700 provides an interface for setting/resetting log-in password, file synchronization (upload and download). The user clicks on "Computer" 1701 on the secure desktop 1700. Unlike a conventional desktop that maps the available local drive(s) and peripherals, the secure desktop 1700 shows only the drive mapped to the memory device. The local files in the drive are synchronized with the associated dedicated storage on the cloud storage system according to the synchronization schedule and/or settings. The user can configure to automatically synchronize when logging in and/or out the secure desktop 1700.

For each memory device, several default folders are created such as root folder, info folder, and share folder. According to one embodiment, the synchronization between the memory device and the cloud storage system occurs independently for each of these root, info, and share folders. The files and subfolders in the root folder of the memory device are automatically backed up in the cloud storage system. Newly created files and recently changed files are uploaded to the cloud storage system. A locally deleted file from the memory device is deleted on the cloud storage system as well.

According to one embodiment, the root synchronization executes several independently-run threads. For example, such threads include a sever-side monitoring thread, a local monitoring thread, and a comparison thread that compares the server-side files and the corresponding local files or vice versa. The refresh rates of these threads may vary depending on the frequency of changes and detection of network failure, or the like.

Figure 19:
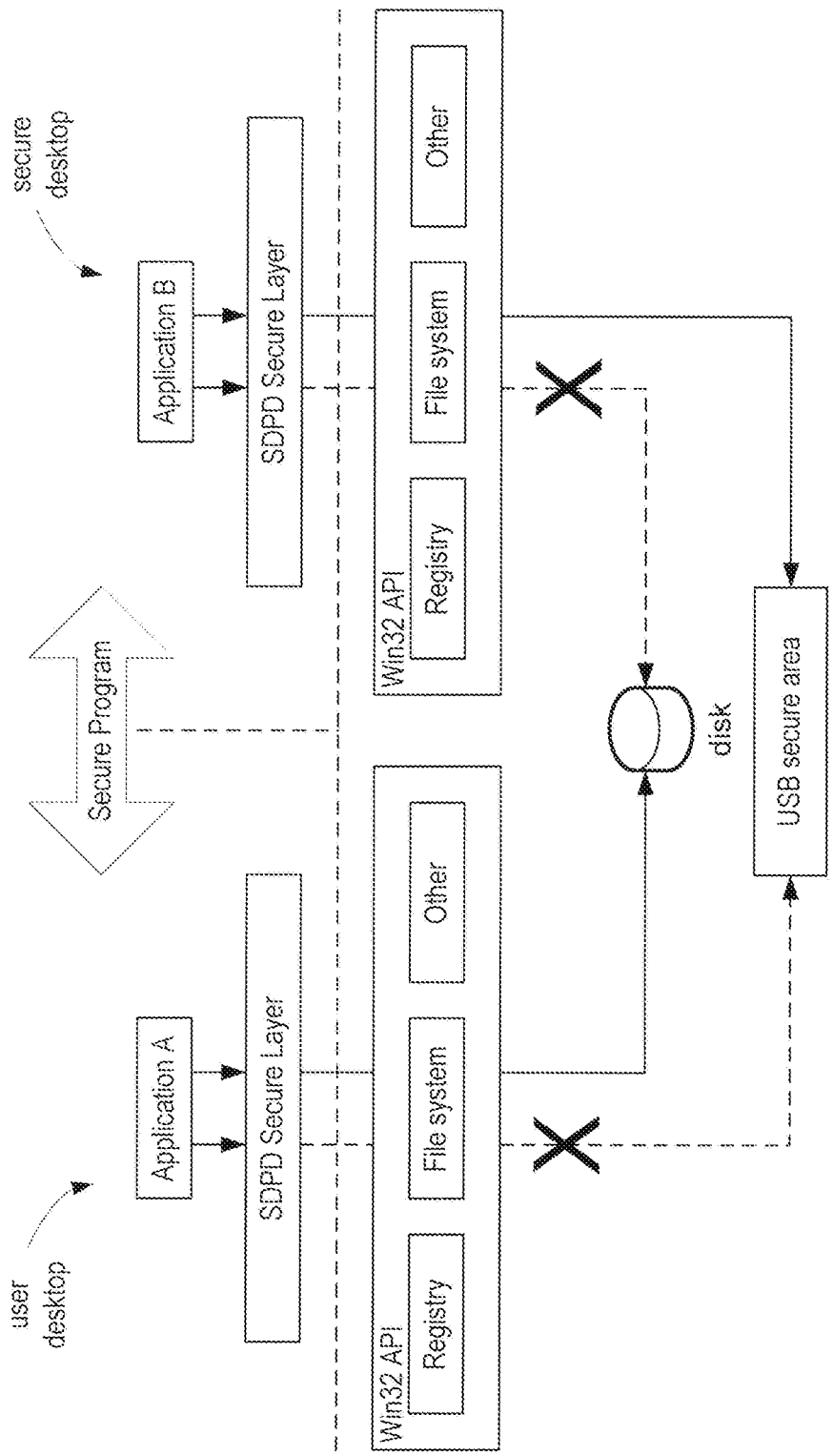
FIG. 19 illustrates the principle of operation of the secure desktop that provides independence from the user's device, according to one embodiment.

According to one embodiment, the secure desktop runs independently from the user's desktop (e.g., Microsoft Windows 7) on the user device. The user is not allowed switch freely from the desktop (e.g., Windows 7) of the user device to the secure desktop 1700. FIG. 19 illustrates the principle of operation of the secure desktop that provides independence from the user's device, according to one embodiment. When the user logs in the memory device, a secure program (e.g., SDPDExe.exe) starts. The user is required to start the secure program to be able to access the memory device. Once the secure program is started, a desktop-like environment, i.e., secure desktop is provided to the user. Within secure desktop, the user is not allowed to access any local drives of the user device, prohibiting the user from locally storing a copy of a remote file on the local drives. For the user to be able to regain access to local drives, the user is required to exit the secure program, and then the user loses access to the memory device, resultantly loses access to the dedicated storage of the cloud storage system that is accessible only from the secure desktop running from the memory device.

The secure program hooks a secure module, thereby placing a secure layer between applications and the system APIs of the user's device. The secure module determines whether to allow, block, or redirect system API calls called from applications. For example, Application B that is running in the secure desktop tries to access a file in the user device's local drive(s), the access request is intercepted by the secure module, a message "ACCESS_DENY" is displayed to the user, and consequently blocks the access request. The security policy is configurable to allow, block, and redirect specific function calls. When Application B attempts to access the secure area of the memory device, those access requests are allowed by calling the hooked Win32 API functions. On the other hand, Application A that is running in the user's desktop is allowed to access the user device's local drive(s) while the request to access the memory device is blocked by the secure module. After the user logs out of the memory device, the secure module is stopped, and the user's desktop is unhooked and fully restored.

According to one embodiment, several users connect to a single user's account of the cloud storage system. The single user is the administrator who owns or possesses remote files to share with the users. Unlike conventional cloud storage system and service that requires a unique account for each user, the present system and method acquires an access token for a single account from the cloud storage system, and stores the access token along with a unique user's information in a memory device to connect to a unique area within the account's user space in the cloud storage system.

A system and method for providing a secure access to a remote file has been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

We claim:

1. A computer-implemented method for providing a secure access to at a cloud storage system, comprising:
   providing a portable memory device storing a secure desktop application, wherein the portable memory device is configured to be removably connected to a user device; and
   granting a secure access to a dedicated storage of the cloud storage system from the user device by running the secure desktop application from the portable memory device,
   wherein the portable memory device contains a secure area that is accessible by the secure desktop application,
   wherein the secure desktop application provides a user interface to view and edit a remote file, stores a local copy of the remote file in the secure area of the portable memory device, and prohibits copying of the remote file to the local storage of the user device by disabling a file access call to copy the remote file to the local storage of the user device is prohibited while the secure desktop application is running on the user device,
   wherein the dedicated storage of the cloud storage system is created based on an identifier of the portable memory device and user information.

2. The computer-implemented method of claim 1 further comprising creating an access token containing login information of an account associated with the dedicated storage of the cloud storage system.

3. The computer-implemented method of claim 2 further comprising:
   storing the access token in a USB token, wherein the USB token is password-protected using a token password; and
   granting an access to the account associated with the dedicated storage of the cloud storage system with the token password of the USB token without providing the login information.

4. The computer-implemented method of claim 2 further comprising storing the access token in the portable memory device, wherein the access token provides the secure access to the dedicated storage of the cloud storage system using the login information.

5. The computer-implemented method of claim 2, wherein the access token provides the secure accesses to the dedicated storage of the cloud storage system via the secure desktop application.

6. The computer-implemented method of claim 2 further comprising:
   receiving authentication of an application to the cloud storage system prior to creating the dedicated storage; and
   configuring the account as instructed by the application,
   wherein the access token is used to configure the portable memory device to access the account on the cloud storage system.

7. The computer-implemented method of claim 1 further comprising providing a password for the portable memory device, wherein the secure access to the dedicated storage of the cloud storage system is granted with the password of the portable memory device when the portable memory device is plugged in the user device.

8. The computer-implemented method of claim 1 further comprising managing storage and distribution of the remote file on the dedicated storage of the cloud storage.

9. The computer-implemented method of claim 2 further comprising:
   sending a remote registration request of the portable memory device;
   storing the access token in the portable memory device; and
   granting the secure access to the dedicated storage of the cloud storage system using the access token.

10. The computer-implemented method of claim 1, wherein the user interface grants access to the secure area of the portable memory device and disables the file access call to the local storage of the user device by hooking to system application programming interfaces (APIs) of the user device.

11. The computer-implemented method of claim 1, wherein the secure desktop application redirects storage of temporary files to the secure area of the portable memory device.

12. The computer-implemented method of claim 11, wherein the secure desktop application determines whether to allow, block, or redirect APIs called from an application running on the user device.

13. A non-transitory computer readable medium having stored thereon computer-readable instructions, which instructions when executed by a processor cause the processor to perform operations comprising:
   providing a portable memory device storing a secure desktop application, wherein the portable memory device is configured to be removably connected to a user device; and
   granting a secure access to a dedicated storage of the cloud storage system from the user device by running the secure desktop application from the portable memory device,
   wherein the portable memory device contains a secure area that is accessible by the secure desktop application, wherein the secure desktop application provides a user interface to view and edit a remote file, stores a local copy of the remote file in the secure area of the portable memory device, and prohibits copying of the remote file to the local storage of the user device by disabling a file access call to copy the remote file to the local storage of the user device is prohibited while the secure desktop application is running on the user device, wherein the dedicated storage of the cloud storage system is created based on an identifier of the portable memory device and user information.

14. A portable memory device comprising:

a secure desktop application configured to run from a user device, and a secure area accessible by the secure desktop application and configured to store a local copy of a remote file stored on a cloud storage system, wherein the portable memory device is configured to be removably connected to the user device, wherein the secure desktop application blocks the user's access provides a user interface to view and edit the remote file, stores a local copy of the remote file in the secure area of the portable memory device, and prohibits copying of a remote file to the local storage of the user device by disabling a file access call to copy the remote file to the local storage of the user device while the secure desktop, wherein the dedicated storage is accessible using an identifier of the portable memory device and user information.

15. The portable memory device of claim 14, wherein the portable memory device is accessible using a password, wherein an access to the dedicated storage of the cloud storage system is granted with the password of the portable memory device when the portable memory device is plugged in the user device.

16. The portable memory device of claim 14 further comprising a remote registration application that is configured to send a request for remote registration of the portable memory device, wherein an access token is stored on the portable memory device, and wherein the access token is used to grant an access right to access the dedicated storage of the cloud storage system.

17. The portable memory device of claim 14, wherein the user interface grants access to the secure area of the portable memory device and disables a file access to the local storage of the user device.

* * * * *